United States Patent [19]
Munk et al.

[11] Patent Number: 5,194,272
[45] Date of Patent: * Mar. 16, 1993

[54] PACK FOR FOODS AND PROCESS FOR THE PRODUCTION THEREOF

[75] Inventors: Werner G. Munk, Vogt ueber Ravensburg; Manfred Klecker, Kuenzelsau-Morsbach, both of Fed. Rep. of Germany; Franz Haas, Leobendorf, Austria

[73] Assignee: Sudmilch Aktiengesellschaft, Stuttgart, Fed. Rep. of Germany

[ * ] Notice: The portion of the term of this patent subsequent to Sep. 18, 2007 has been disclaimed.

[21] Appl. No.: 547,938

[22] Filed: Jul. 3, 1990

Related U.S. Application Data

[62] Division of Ser. No. 134,175, Dec. 17, 1987, Pat. No. 4,957,754.

[30] Foreign Application Priority Data

Dec. 18, 1986 [DE] Fed. Rep. of Germany ....... 3643199

[51] Int. Cl.$^5$ .......................... A21D 13/00; A23P 1/08
[52] U.S. Cl. ...................................... 426/94; 426/138; 426/139; 426/302; 426/303; 426/307
[58] Field of Search ................. 426/94, 138, 139, 302, 426/303, 307

[56] References Cited

U.S. PATENT DOCUMENTS

| | | | |
|---|---|---|---|
| 2,167,353 | 7/1939 | Frediani | 426/95 |
| 3,366,486 | 1/1968 | Weinstein | 426/138 |
| 4,293,572 | 10/1981 | Silva et al. | 426/94 |
| 4,390,553 | 6/1983 | Rubenstein et al. | 426/138 |
| 4,401,681 | 8/1983 | Dahle | 426/94 |
| 4,472,440 | 9/1984 | Bank | 426/128 |
| 4,603,051 | 7/1986 | Rubenstein et al. | 426/138 |
| 4,629,628 | 12/1986 | Negro | 426/138 |
| 4,762,721 | 8/1988 | Holscher et al. | 426/94 |
| 4,764,386 | 8/1988 | Bernacchi et al. | 426/293 |
| 4,781,932 | 11/1988 | Skarra et al. | 426/138 |

FOREIGN PATENT DOCUMENTS

| | | | |
|---|---|---|---|
| 0045522 | 2/1982 | European Pat. Off. | 426/139 |
| 846440 | 2/1960 | United Kingdom | 426/139 |
| 947672 | 1/1964 | United Kingdom | 426/139 |

*Primary Examiner*—Jeanette Hunter
*Assistant Examiner*—Mary S. Mims
*Attorney, Agent, or Firm*—Lackenbach Siegel Marzullo & Aronson

[57] ABSTRACT

Pack for containing foods made from a porous material, and having for sealing purposes on at least one part of an inner wall of the food pack at least two different fat-based impregnations, at least one of which is a first or prime coat and at least one other is a cover glaze or impermeable top glaze, wherein at least the cover glaze or impermeable top glaze is free from saccharose.

31 Claims, No Drawings

PACK FOR FOODS AND PROCESS FOR THE PRODUCTION THEREOF

This is a division of application Ser. No. 134,175 filed Dec. 17, 1987, now U.S. Pat. No. 4,957,754.

The invention relates to a pack for foods made from rottable, porous material, provided on at least one part of the inner wall for sealing purposes with at least two different fat-based impregnations, whereof at least one is a first coat and at least one other is a closed cover glaze and a process for the production thereof.

The vast number of plastic packs causes considerable disposal and environmental problems. Particularly in the case of foods, especially those intended for immediate consumption, plastic packs are frequently used. In the case of consumption in the open air, they are frequently thrown away and then the packs often take years to decompose.

Many paper packs exist, but paper is not suitable for water-containing fatty or air-sensitive foods. Coated papers generally contain a very fine covering of a plastics material, which once again leads to waste disposal problems. For foods, there are also packs made from edible materials, such as ice cream wafer containers or cornets. However, such wafer containers are only suitable for the very brief holding of ice cream, i.e. frozen foods. Inside of such wafer containers are generally impregnated with coconut oil, in order to prevent immediate softening and destruction of the container. However, such an impregnation only provides a short-term protection. Attempts to make finely porous packing materials tight by merely using more coconut oil for impregnation purposes have not been successful, because when larger coconut oil quantities are used it soaks through, which is not desired. In addition, when applied more thickly, coconut oil tends to crack formation, so that the desired result is not obtained.

DE-AS 1 221 585 discloses a process for protecting the surface of a long-life pastry or bakery product to be filled against soaking through. The product, e.g. a wafer cup, is initially impregnated with a fat first coat and onto this impregnated surface is then applied a colloidal fat dispersion, to which is immediately applied the filling material at temperatures below $-3°$ C. The cold filling material leads to the immediate setting of the colloidal dispersion. The colloidal dispersion is constituted by a chocolate dispersion in the form of a mixture of coconut oil, sugar, milk powder and ground cocoa bean particles. Ice cream can be stored for a long period in the frozen food chest when placed in such impregnated long-life bakery products. A brief heating up to room temperature is also possible. However, for prolonged storage in the so-called cooling space, i.e. at temperatures over $0°$ C. such impregnation proves unsuitable, because softening occurs.

International application WO 83/01726 discloses an edible container in the form of a baked bread roll, which has a conical depression, whose crusty inside is provided with a fat glaze for increasing the natural impermeability, so that moist or even liquid foods can be introduced into it. The edible container is not intended for storage, but instead for immediate consumption.

The problem of the invention is to provide a pack, which can be kept for at least a limited time at the storage or use temperature of the food of over $0°$ C., whilst being easily disposable. The pack should also be suitable for liquid, oily and air-sensitive substances.

The invention is characterized in that at least one cover glaze is free from saccharose. Preferably the at least one first coating is also free from saccharose.

Although the sugar crystals in the cover glaze according to DE-AS 1 221 585 are enclosed by the fat mass, it has been found that the complete omission of sugar in the cover glaze leads to a considerable improvement in the sealing action, so that even liquids can be kept in the cooling space for long periods. Preferably at least the cover glaze is also free from other soluble saccharides and this advantageously also applies with respect to the first coat.

According to the invention the seal can be formed in that at least two different impregnations on a fatty base are provided, whereof the first preferably has a higher temperature setting range than the second. In this way the cover glaze can be applied as the second impregnation without melting the first impregnation. The second and optionally further impregnation is consequently in a position to fill the pores and form a closed layer on the pack inside. The difference between the melting or setting ranges of the first coat and the cover glaze is preferably not over $5°$ C. and in particular not over $2°$ C.

Preferably vegetable fat is used as the fat. The fats of the fat glazes preferably have different hydrophobic settings, the hydrophoby increasing from the pack wall material towards the pack interior. A less hydrophobic fat glaze penetrates well into the pores of the less hydrophobic packing material, because it is able to wet the pack material surface. Simultaneously the less hydrophobic impregnation forms an adhesive base for the more hydrophobic fat glaze, so that scaling off of the hydrophobic fat glaze is prevented. The fat glaze of the top coat which is more hydrophobic than the coconut oil is in turn very stable with respect to a liquid or moist pack content and also ensures for a prolonged period the necessary sealing, even with respect to food acids.

According to a particularly preferred embodiment, the cover glaze contains finely divided solids, which are not soluble in fat. Such finely divided solids lead to an increased strength and resistance of the cover glaze. The finely divided solids, which are preferably readily wettable by the fat, simultaneously prevent the fat from being sucked up by the pores of the pack material. With particular advantage at least one solid-free fat glaze is used for priming and pre-impregnation and it is then covered with at least one solid-containing cover glaze. Generally two glazes are sufficient, namely a priming glaze and a cover glaze. Sealing is increased by a multiple application of correspondingly smaller quantities. The coating thickness of the cover glaze is preferably 0.1 to 1 mm, in particular 0.2 to 0.5 mm, this relating to the thinnest points.

The pack material preferably has a biological and in particular vegetable origin, is e.g. based on cereals. Materials based on starch and/or cellulose are preferred.

With particular advantage the pack comprises at least partly edible material, which is present in the dry and more especially thoroughly baked state. This function is particularly appropriately fulfilled by long-life baked products, such as wafers, products of the crispbread type, extrudates and in particular those based on rice and/or maize, as well as edible starch flour products. Packs made from starch flour paste are soft and elastic, i.e. they have good mechanical characteristics and can also be coloured and printed on. The packs can even be flour-free, particularly using only starch and water, the addition of lactose being advantageous. Edible packing materials provided with the inventive cover glaze do not lead to any disposal problems, because they are able to rot, or can be consumed when consuming the content. Appropriately a covering is provided for hygienic reasons and this can e.g. comprise easily rottable paper or the like.

The material for the inventive pack is preferably self-supporting and stiff, thin-walled packs being particularly advantageous. In the case of edible packing materials, the wall thicknesses are generally below 6 mm and in particular in the range 0.5 to 5 mm, whereby the starch flour pastry tends to be in the lower range and the wafer pastry in the upper range. The inner surfaces of containers to be coated are preferably smooth, if no account is taken of the natural pores. The outside can be structured. Walls and bottom preferably pass into one another with rounded edges.

The inventive pack is preferably in the form of a container, such as a box or cup. Such a container can be sealable in moisture-tight and optionally air-tight manner. For this purpose a cover or closure made from the same or different material compared with the remainder of the pack can be provided in the same way with a cover glaze. This set cover glaze can be used for heat sealing or for the tight welding of the cover to the remainder of the container. For this purpose the cover glaze can e.g. be melted by warm air in the region between the contact surface of the cover and the container edge and can be set by cooling after fitting the cover. This makes it possible to store for a sufficiently long period liquid and/or fatty and also air-sensitive foods, without them spoiling or without the pack losing its protective function and strength.

However, the pack can also be in some other form and especially in the case of a compact, non-flowable content or if a complete enveloping is not required for other reasons, it can be in the form of a tube open on at least one side, in the form of plates, particularly sandwich plates, dishes or trays. As a function of the pack content, there is also no need to provide the entire inner wall with cover glaze. Thus, a partitioned box or the like can have the cover glaze in one part and can be filled with a liquid or oily food, whereas the other part can store dry products, such as nuts, pastry, etc. The pack capacity can vary widely and is generally between a few milliliters and a liter, especially in the range 25 to 1000 cm$^3$.

The fat glaze quantity per surface unit is advantageously in the range 4 to 10 g/100 cm$^2$, no matter whether it is in the form of one or several coatings. The priming quantity is generally 2 to 6, especially 4 to 6 g/100 cm$^2$ and the cover glaze quantity is generally 2 to 4 g/100 cm$^2$.

The finely divided solid of the cover glaze is preferably difficulty soluble and in particular insoluble in food acids. The solid must be admissible according to food regulations, but need not be digestible. The solid can be constituted by materials having an organic origin, particularly those which have food characteristics. Preferred solids are dry milk products, such as milk powder, milk protein and whey protein. Particular preference is given to casein and especially casein which is cold soluble in water. Other swellable substances, such as cold-swelling starch and in particular when mixed with casein can be used. Swellable substances may have the capacity to bind penetrated water and thereby act in a sealing manner. Preference is given to pasteurizable glazes, such as is e.g. the case with a cover glaze containing cold soluble casein.

The quantity of solid powder in the cover glaze can vary within wide limits and is preferably 10 to 80, especially 15 to 50% by weight, based on the cover glaze weight. The most favourable range for casein is approximately 25 to 30% by weight. For the cover glaze, preference is given to the use of fat mixtures, particularly those with suitable set softening or setting ranges. As a result the cover glaze remains elastic to plastic at the storage and use temperature, so that cracking is avoided in the case of temperature fluctuations and any mechanical stressing of the pack. The softening or setting range is preferably within a 4° to 8° C. temperature range. The setting or softening range level, measured as the slip point according to the DGF unit method C-IV 3a (1952) or as the solidification point according to the DGF unit method C-IV 3c (1957), is a function of the storage and use temperature of the pack content and can be between 15° and 45° C. Generally a softening range between 20° and 40° C. is adequate for many uses, such as e.g. for foods in the cooling space and also for those stored at normal temperature.

The desired hydrophoby can be obtained in that use is made of fats with long-chain fatty acids and/or long-chain alcohols and hardened fats. Hydrogenated soybean oil, particularly when mixed with coconut oil has proved satisfactory. The mixing ratio can be 40 to 90% by weight of hydrogenated soybean oil and 10 to 60% by weight of coconut oil and is preferably 60 to 80% by weight hydrogenated soybean oil and 20 to 40% by weight coconut oil. Hydrogenated soybean oil is made elastic by adding coconut oil. The softening or setting range of hydrogenated soybean oil can be adjusted by mixing with soybean oil and generally 5 to 10% by weight of the latter is sufficient for this. This also applies with regards to other fats and oils. In place of vegetable fats, it is also possible to use corresponding animal fats, such as hardened whale oil. Preference is given to so-called ester-free fats and also non-esterified, long-chain fatty acids. Hydrophobic waxes, such as e.g. carnauba wax, which are allowed by the food regulations are also suitable. Through the hydrophobic setting of the fats of the cover glaze, the latter becomes particularly stable with respect to lactic acid and other food acids. The cover glaze is advantageously coloured or dyed. It can be white pigmented, or can also have another colour suitable for the pack content and/or pack. The cover glaze, particularly the solids proportion, is preferably free from lipase.

Preferably those fats which are low-viscous in the melted state are used for the first coat or the adhesive base. Coconut oil and hardened fats with a melting range at or above that of the cover glaze and in particular in the range 22° to 40° C. are particularly suitable for this purpose.

The invention also relates to a process for producing the inventive pack. This process is characterized in that at least one melted, fatty, saccharose-free material in at least one layer is applied to the preimpregnated inner surface of the preferably precooled pack to be coated until a closed cover layer is formed and then setting takes place by cooling. The material is preferably free from readily water-soluble components and is in particular applied in the anhydrous state.

The cover glaze is preferably applied just before the filling of the pack. Prior to filling, the pack is advantageously cooled to the filling temperature below the melting range, so that the cover glaze rapidly becomes solid before filling takes place.

The glazes can be applied by dipping, coating, spraying, etc., preference being given to spraying. Cup-shaped pack parts are preferably kept with the opening downwards during or after spraying, so that excess fat can drip off. This can be accompanied by a coating of the pack edge, which can be used for sealing purposes. So-called displacement coating with the aid of substantially accurate fitting inner punches has proved satisfactory. If the cover glaze and preferably also the first coat are pasteurized or briefly heated, then particularly long storable packs are obtained. The containers or packs are preferably used in the sterile or almost sterile state.

The invention also relates to containers which are suitable for coating with the cover glaze. Such containers have a porous inner wall, which is otherwise smooth, i.e. free from grids or ribs. Smooth-wall subdivisions, which in turn have a porous innerface, can however be provided. The containers are preferably edible and shaped in one piece from a dough, which is thoroughly baked to dryness. A suitable dough is the per se known dough for long-life bakery products and in particular starch flour dough. The dough preferably has a reduced sugar content, particularly in the range 2 to 8% by weight, or can be substantially sugar-free. The moisture sensitivity of the long-life baked product is reduced by decreasing the sugar content. Simultaneously a high fine porosity is obtained, which favours a diffusion of liquid from the inside to the outside. The fine porosity also gives a good thermal insulation. If desired, the outside can also be impregnated with a fat first coat, which is preferably porous.

A suitable wafer dough has in particular the following compositions:

| Flour | 20 to 40 and preferably approximately 25% by weight. |
|---|---|
| Potato starch | 5 to 25 and preferably approximately 20% by weight. |
| Sugar | 0 to 10 and preferably 2 to 8% by weight. |
| Salt | 0 to 1 and preferably approximately 0.4% by weight. |
| Lecithin | 0 to 0.5 and preferably approximately 0.3% by weight. |
| Fat | 1 to 5 and preferably approximately 3% by weight. |
| Soybean flour | 0 to 5 and preferably approximately 3% by weight. |
| Flavouring substances | 0 to 0.5 and preferably 0.1% by weight. |
| The remainder water. | |

A starch flour paste formed from purified starch, particularly advantageously usable for producing colourless containers, but which can also be mixed with colour additives, in particular has the following composition in parts by weight:

| Flour | 30 to 50, particularly approximately 40 |
|---|---|
| Starch | 30 to 40, particularly approximately 33 |
| Sugar | 0 to 20, particularly approximately 13 |
| Salt | 0 to 1, particularly approximately 0.7 |
| Lecithin | 0 to 1, particularly approximately 0.5 |
| Fat | 3 to 7, particularly approximately 5 |
| Flavouring substances | 0 to 0.25, particularly approximatley 0.2 |
| Soybean flour | 3 to 7, particularly approximately 5. |

Water with a dry substance to water ratio of approximately 3:2.

Baking of this starch flour paste takes place in the same way as for wafer dough, the temperature being controlled in such a way that there is no yellow or brown colouring. The flour can also be completely replaced by starch.

Coconut oil with a melting range of 24° to 27°. C. is suitable for the first coat, if storage is to take place in the cooling space (+4° to +15° C.). Hardened fats and the mixture thereof with oils with a melting range over 30° C., particularly 35° to 40° C. is preferred for storage at normal temperature.

The cover glaze advantageously is also a function of the temperature at which the filling material is to be stored. Fat mixtures with melting ranges of approximately 20° to 25° C. are suitable for the cooling space, whereas for storing at normal temperature a melting range of 35° to 40° C. is suitable. Preferred cover glazes contain in parts by weight:

| Hydrogenated soybean oil (melting point 38° C.) | 50 to 90 |
|---|---|
| Soybean oil | 0 to 20 |
| Coconut oil | 50 to 10 |
| Casein | 10 to 60 |

The casein can be in the form of native casein or as caseinate. Preference is given to milk protein or casein cold soluble in water.

Further features of the invention can be gathered from the following examples in conjunction with the subclaims. The individual features can be realised singly or in the form of combinations in the individual embodiments.

EXAMPLE 1

A set of three wafer cups are baked using a per se known wafer dough, but which is substantially sugar-free. Baking takes place in a pastry mould, whose core used for forming the inner wall is smooth. The cups are similar to plastic yoghurt cups and are interconnected via their upper, horizontal flange edges. Additionally there are also preferably vertically directed, stiffening connecting webs. They can be shaped onto the underside of the flange-like connecting edges and can interconnect the container walls. The reinforcing webs can also be provided separately from the upper flange edge. The cups can externally have a smooth surface, or can be structured.

The precooled cups are sprayed with hardened vegetable fat (coconut oil, degree of hardness 23° to 28° C.) using an atomizer at a fat temperature of +30° and then immediately cooled by placing in a refrigerator at a temperature of approximately +8° C. Thus, the first coat sets within the surface coating and is present in the desired quantity. Simultaneously a soaking through of the fat is prevented.

The cooled, impregnated cups are sprayed with a cover glaze just prior to filling and said glaze has the following composition in parts by weight:

| Hydrogenated soybean oil (degree of hardness 38° C.) | 45 |
|---|---|
| Soybean oil | 5 |
| Coconut oil | 50 |

-continued

| | |
|---|---|
| Caseinate (spray-dried) | 50 |

The total fat content of the cover glaze is consequently approximately 67% by weight. The caseinate is mainly used for increasing the mechanical strength of the cover glaze, particularly with a view to preventing cracking, but also gives the glaze a uniform white colouring. In this example, the cover glaze is also set to a degree of hardness or setting range of +23° to +27° C. The wafer cups are sprayed with the opening turned downwards and the glaze sprayed at +30° C. immediately sets on meeting the inner wall of the cup, at least at the contact surface. Excess material can drip downwards and simultaneously gives a slight bead on the flattened cup edge, which is used for subsequent sealing with a cover coated in the same way.

The thus coated set of three is cooled to temperatures of +10° to +12° C. and then filled at this temperature to 1 cm below the upper edge. The filling material is yoghurt, particularly fruit yoghurt or cottage cheese. The cover is then applied and sealed by briefly heating the edge region, e.g. with hot air. The filled cup can be stored for a long period in the refrigerator at temperatures of +10° to +12° C., without the moisture soaking through.

For hygienic reasons, it is recommended that the cups be placed in a thin protective sleeve, which need not be self-supporting. It is sufficient for this purpose to use a paper sleeve or any other, preferably ventilated envelope.

EXAMPLE 2

Two rectangular disks made from a cereal extrudate of length 14 cm, width 5 cm and thickness 0.5 cm are sprayed at room temperature on one side twice with coconut oil (degree of hardness 23° to 27° C.). The second spraying takes place immediately following the solidification of the first fat application. 4 g of coconut oil are used per disk for this first coat. The disks are then cooled in the refrigerator to approximately +8° C.

For producing the cover glaze 37 parts by weight of hydrogenated soybean oil, 4 parts by weight of soybean oil and 7 parts by weight of coconut oil are melted together. Into the melt are then stirred 14 parts by weight of cold soluble casein, it being simultaneously possible to optionally add flavours and dyes. This cover glaze mix is pasteurized and at a temperature of +27° C. is applied thinly with a brush to the cooled extrudate disks which have been provided with a first coat, followed by solidification at ambient temperature. The cover glaze quantity is 2 to 3 g per disk. The disks impregnated and coated in this way are then again cooled in the refrigerator to +8° to +10° C. The extrudate disks are then placed on both sides on a 5 mm thick pork cheese disk and pressed slightly, the impregnated side being directed towards the pork cheese. The thus formed sandwich is vacuum-packed at 0.4 to 0.6 bar in polypropylene film. The sandwich can be stored in the cooling space for days without the extrudate disks becoming soft.

EXAMPLE 3

A circular wafer cup with a flat bottom made from a sugar-free dough is coated with the glazes described in example 2 for the first coat and for the cover glaze under the conditions described therein, but the cover glaze is applied by displacement coating. The cup is then filled with chemically preserved meat salad and sealed with a cardboard inlay cover, which has also been impregnated. Sealing takes place by pressing the cover edge into the cover glaze of the inside of the cup. The meat salad could be kept in the cooling space for its keeping period without any softening or soaking through phenomena appearing on the wafer cup.

EXAMPLE 4

An ice cream wafer cup with a flat bottom was produced in a wafer cup mould using a starch flour paste. The cup had a thin wall, was elastic and was white. The cup was firstly primed with a mixture of 80 parts by weight of hydrogenated soybean oil and 20 parts by weight of coconut oil, followed by coating with a cover glaze of 85 parts by weight of hydrogenated soybean oil, 15 parts by weight of coconut oil, 25 parts by weight of acid casein powder and 10 parts by weight of cold-swelling starch powder. The coated cup was filled with marmalade after solidifying the cover glaze at room temperature. The cup kept firm and dry on storing at ambient temperature.

EXAMPLE 5

Viscous starch flour paste was blown to a bottle shape in a mould and then baked. The bottle was then internally primed twice with a mixture of 80 parts by weight of hydrogenated soybean oil and 20 parts by weight of coconut oil, followed by coating twice with a cover glaze. The cover glaze contained 85 parts by weight of hydrogenated soybean oil, 15 parts by weight of coconut oil and 70 parts by weight of acid casein. Both glazes were pasteurized prior to application. After cooling and solidifying the cover glaze the bottle was filled with conserved, carbon dioxide-free lemonade to just below the opening and was then sealed with an impregnated starch flour stopper.

The bottle was tight and firm. The breaking strength of the bottle could be increased by incorporating cellulose fibres into the starch paste at the time of producing the bottle. After use the bottle can be thrown away. It rots in the open or in refuse, without leaving behind harmful or disturbing residues.

The invention is not restricted to the examples described. In fact, numerous modifications thereof are possible without passing beyond the scope of the invention. Thus, the novel starch or starch flour containers, particularly in cup or beaker form are also suitable for other purposes for which the hitherto known wafer of ice cream cornets have been used. For ice cream and at temperatures below 0° C., they can be used in the same way as conventional wafer cups or cornets without impregnation or with a conventional coconut oil impregnation, as used here for the first coat.

We claim:

1. Pack or container for containing foods made from a porous material, and having for sealing purposes on at least one part of an inner wall of the container for the food pack at least two different fat-based impregnations, at least one of which is a first or prime coat and at least one other is a cover glaze or impermeable top glaze, characterized in that at least said cover glaze or impermeable top glaze is free from saccharose.

2. Pack according to claim 1, characterized in that the cover glaze contains at least one finely divided solid incorporated and insoluble in said at least one other fat-based impregnation.

3. An edible container for food comprising a porous vegetable material having on at least one part of its inner surface at least two different fatty impregnations, at least one impregnation is a prime coat and at least one impregnation is an impermeable top glaze, and at least one impregnation is sugar-free; and wherein said container is filled with at least one food containing liquid components of at least one of an aqueous and an oily basis.

4. The food pack container as in claim 2, wherein the finely-divided solid is acid casein.

5. The food pack container as in claim 2, wherein the finely-divided solid is water-soluble casein.

6. The food pack container as in claim 2, wherein the finely-divided solid is powdered milk protein.

7. The food pack container as in claim 2, wherein the finely-divided solid is casein.

8. A container for food comprising a porous, biodegradable, vegetable material having on at least one part of its inner surface at least two different fatty impregnations, at least one of which is a prime coat and at least one is an impermeable top glaze, and at least one fatty impregnation of the top glaze is sugar-free; and wherein said top glaze is stable to acids to a pH level of 4 and comprises a food-grade, hydrophilic, fat-insoluble, finely divided solid comprising casein, and said container is filled with at least one containing a liquid components of at least one of an aqueous and an oily basis.

9. A container as in claim 8, wherein the vegetable material is baked dough.

10. A container as in claim 9, wherein the vegetable material is an extrudate.

11. A container as in claim 8, wherein the vegetable material is an unbaked dough.

12. A container as in claim 8, wherein the vegetable material is a fibrous cellulosic.

13. A container as in claim 8, wherein the prime coat has a higher setting temperature than the impermeable top glaze.

14. A container as in claim 8, wherein the top glaze is more hydrophobic than the prime coat.

15. A container as in claim 8, wherein the acid to which the top glaze is stable is lactic acid.

16. A container as inclaim 8, wherein the casein is selected from the group consisting of acid casein, water-soluble casein, or mixtures thereof.

17. A container as in claim 8 or 16, wherein the finely-divided solid exclusively comprises casein.

18. A container as in claim 8 or 16, wherein the finely-divided solid comprises casein and a water swellable substance.

19. A container as in claim 8, wherein the insoluble, finely-divided solid comprises 10 to 80 weight percent of the top glaze.

20. A container as in claim 17, wherein the top coat comprises a food-grade, hydropilic, fat-insoluble, finely-divided solid.

21. A container as in claim 8, wherein the top glaze comprises a hydrogenated fat.

22. A container as in claim 21, wherein the hydrogenated fat comprises hydrogenated soybean oil.

23. A container as in claim 22, wherein the top glaze comprises a mixture of hydrogenated soybean oil and coconut oil, said mixture having from 30 to 90 weight percent hydrogenated soybean oil and 70 to 10 weight percent coconut oil.

24. A container as in claim 8, wherein the container is filled with food having at least one hydrophilic and at least one hydrophobic liquid component.

25. A container as in claim 9, wherein the baked dough is sugar-free and has a long shelf-life.

26. A container as in claim 9, wherein the baked dough is a white, starch-flour dough.

27. Process for producing the pack according to claim 1, characterized in that for sealing the desired pack regions pre-impregnated with at least one first coat, particularly based on coconut oil, at least one saccharose-free cover glaze is applied and is solidified by cooling; and wherein said container is filled with at least one food containing liquid components of at least one of an aqueous and an oily basis.

28. Process according to claim 27, characterized in that the cover glaze is applied just prior to the filling of the pack, the container is then cooled for solidifying the cover glaze and then the cooled container is filled and optionally sealed.

29. Process according to claim 27, characterized in that prior to application, the cover glaze material is heated to just above its setting temperature and application takes place at a temperature which is below the softening point of the first coat.

30. Process according to claim 28, characterized in that the cover glaze is applied to the precooled pack wall material, which is at a temperature below +15° C.

31. Process according to claim 27, characterized in that at least the cover glaze is pasteurized or briefly heated prior to application.

* * * * *

UNITED STATES PATENT AND TRADEMARK OFFICE
CERTIFICATE OF CORRECTION

PATENT NO. : 5,194,272
DATED : March 16, 1993
INVENTOR(S) : Werner Georg Munk, et. al.

It is certified that error appears in the above-indentified patent and that said Letters Patent is hereby corrected as shown below:

Title page, item [73], Assignee: should be-- Werner Georg Munk, Bergstrasse 12 D-7981 Vogt Ueber, Ravensburg, Germany--.

Signed and Sealed this

Ninth Day of August, 1994

Attest:

BRUCE LEHMAN

Attesting Officer

Commissioner of Patents and Trademarks